United States Patent [19]

Dennis

[11] Patent Number: 5,247,805
[45] Date of Patent: Sep. 28, 1993

[54] FAN CYCLING MEANS OF HEAD PRESSURE CONTROL

[75] Inventor: Richard D. Dennis, Bridgeport, N.Y.

[73] Assignee: Carrier Corporation, Syracuse, N.Y.

[21] Appl. No.: 670,815

[22] Filed: Mar. 18, 1991

[51] Int. Cl.⁵ .............................................. F25B 39/04
[52] U.S. Cl. .................... 62/184; 62/DIG. 17
[58] Field of Search .......... 62/184, 181, 183, DIG. 17

[56] References Cited

U.S. PATENT DOCUMENTS

| 2,943,457 | 7/1960 | Wile et al. | 62/184 |
| 3,354,665 | 11/1967 | Lewis | 62/184 |
| 4,507,933 | 4/1985 | Chapa et al. | 62/184 |

*Primary Examiner*—Harry B. Tanner

[57] ABSTRACT

In a heat pump system intended for cooling operation at lower ambient conditions, a control is provided for sensing the compressor discharge pressure and for alternately providing power to and removing power from the outdoor fan in response to the discharge pressure respectively exceeding or falling below a predetermined level. Power is provided to and removed from the motor by way of a solid state relay, and the periods in which power is removed are controlled so as to exceed those periods in which the power is applied to the motor. The fan motor is supported by journal bearings, and the periods of time in which power is removed from the motor during the cycling process is limited to 10 seconds such that the motor does not come to a complete stop, thereby ensuring proper lubrication thereto.

17 Claims, 3 Drawing Sheets

DISCHARGE PRESSURE { 205 psig
SUCTION PRESSURE { 70 psig  ±5

FAN CYCLING MEANS OF HEAD PRESSURE CONTROL

BACKGROUND OF THE INVENTION

This invention relates generally to air conditioning systems and, more particularly, to a method and apparatus for controlling the head pressure of an air cooled condenser.

The condenser of an air conditioning system is normally located out of doors or in heat exchange relation with outdoor air. It is therefore subject to a wide variety of ambient temperature conditions, including very cold conditions. For example, even in the winter, air conditioning is required, and possibly at full capacity, for such applications as cooling computer rooms and the like. During such winter operation, lower outdoor temperatures may materially reduce the condensing temperature of refrigerant in the condenser. For example, a typical air cooled refrigeration system might have a condensing temperature of 125° F. when employing R-22 as refrigerant with an outdoor temperature of 95° F. However, the same system operating at a 0° F. outdoor temperature will cause the condensing temperature to drop as low as 30° F. This, in turn, produces a corresponding reduction in head pressure on the high pressure side of the system. The result is that the pressure at the refrigerant expansion device is substantially reduced such that less refrigerant is passed to the evaporator, and the capacity of the system is therefore reduced. If adequate pressure is not maintained at low ambient temperatures, the evaporator temperature may drop below freezing and cause condensation moisture to freeze on the evaporator coil. The resulting layer of ice tends to insulate the coil from the refrigeration mode and causes a further reduction in system capacity.

A common approach in maintaining an adequate head pressure is to provide a variable speed motor for driving the condenser fan. The condensing temperature is monitored, and when it drops below a predetermined level, the speed of the fan motor is reduced to thereby reduce the capacity of the condenser, thereby raising the condensing temperature. Such an apparatus is described in U.S. Pat. No. 3,196,629 assigned to the assignee of the present invention. While this approach is very affective and has long served the industry, it is recognized that such an approach requires a relatively expensive variable speed motor and control system.

Another approach that has been considered, but which has not been found to be practical for reasons to be discussed hereinafter, is that of cycling a single speed fan motor between equal times of the on and off conditions. Since this brings about a rather rapid response of the system, rapid cycling (e.g. several times per minute) can result. While this may be practicable where several fans are employed, such that the switching can be varied from fan to fan, such a practice has not been practicable heretofore with a single fan since the reliability and life of the necessary switching mechanisms have been inadequate. That is, conventional switching mechanisms would not hold up to the cycling requirement over a prolonged period of time and would therefore be economically unfeasible. Further, it has been found that operation will equal periods of on and off conditions tends to cause the suction pressure to drop to undesirable levels, especially at lower ambient temperatures.

A further complication that results from such a fan cycling approach is that of lubricating the fan motor in a proper manner. For example, as a motor is started up, it is necessary to draw the lubricating oil up into the applicable area surrounding the shaft. During that process, a shaft supported by simple journal bearings would not normally be adequately lubricated and its temperature would tend to increase. Normally this would be acceptable since the supply of the lubricating oil would eventually become adequate and the shaft would then be allowed to cool. However, if the motor is turned off prior to that occurrence and is then soon thereafter turned back on, the supply of lubricating oil would still be inadequate, and the temperature of the shaft would tend to rise further. Eventually, damage would occur to the bearings.

If the frequency of the on-off cycling is such that the motor is on long enough for the oil to reach the bearing, but is then off long enough for the oil to drain out of the bearing, the bearing will again be oil starved upon start-up. Continued operation in this manner may eventually lead to failure. For that reason, in such applications, it has been necessary to use ball bearings in the fan motors. These are considerably more expensive than the sleeve bearings.

It is therefore an object of the present invention to provide an improved method and apparatus for maintaining head pressure in an air cooled condenser of an air conditioning system.

Another object of the present invention is the provision for a head pressure control system which is reliable and of long life.

Yet another object of the present invention is the provision in a head pressure control system for ensuring proper lubrication of the fan motor bearings.

Still another object of the present invention is the provision for a head pressure control system which is effective in use and efficient and economical in operation.

These objects and other features and advantages become more readily apparent upon reference to the following description when taken in conjunction with the appended drawings.

SUMMARY OF THE INVENTION

Briefly, in accordance with one aspect of the invention, compressor discharge pressure is continually sensed to determine when it drops below or rises above a predetermined level. A solid state switching means is caused to operate in response thereto such that when the pressure drops below the threshold, the switching means shuts off power to the condenser fan motor, and when it subsequently rises above that threshold, the power to the fan motor is turned on. The time periods when the power is off always exceeds the time periods when it is on. Such a solid state sensing and switching control system ensures reliable operation over a long period of time.

By another aspect of the invention, the fan motor is supported by sleeve bearings and the control system is caused to function in such a manner as to ensure that the sleeve bearings are adequately lubricated. In particular, the duration of off-time is limited such that the motor never comes to a complete stop and the lubricating oil does not have sufficient time to drain from the bearings before the next on cycle commences. In this way, an adequate supply of lubricant oil is retained within the sleeve bearings.

In the drawings as hereinafter described, a preferred embodiment is depicted; however, various modifications and alternate constructions can be made thereto without departing from the true spirit and scope of the invention.

THE DESCRIPTION OF THE PREFERRED EMBODIMENT

Figure 1:
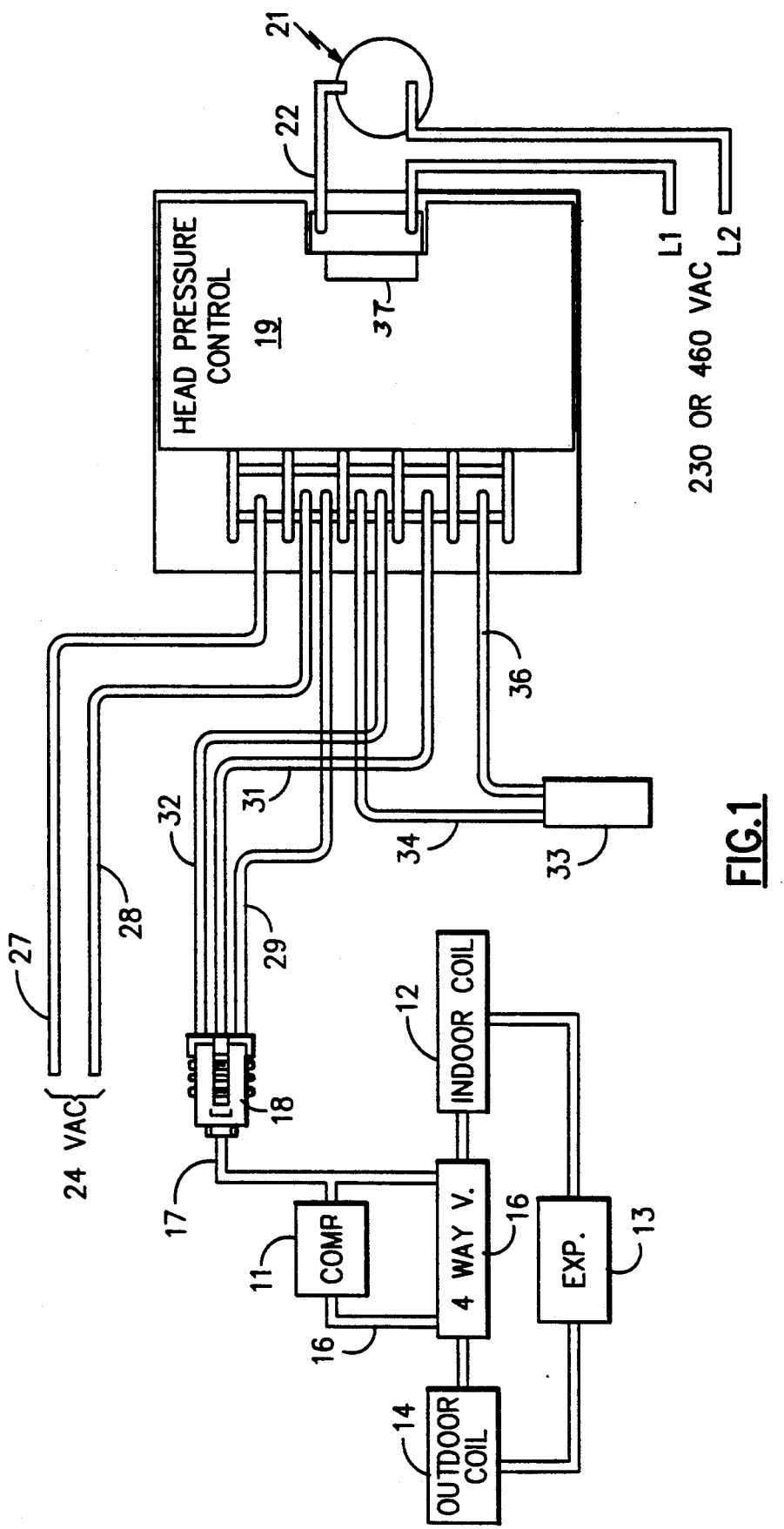
FIG. 1 is a schematic illustration of air conditioning system with the present invention incorporated therein.

Referring now to FIG. 1, a heat pump system is shown to include a compressor 11 an indoor coil 12, an expansion device 13, and an outdoor coil 14. A 4-way, or reversing, valve 16 is provided to selectively direct the refrigerant flow to accommodate the respective cooling, heating, or defrost modes of operation. In all modes of operation, the compressor 11 draws refrigerant from the suction line 16 and discharges it to the discharge line 17.

The existence of the problem which the present invention is designed to address (i.e. the loss of head pressure during cooling modes of operation as brought about when the ambient temperature is relatively low), is sensed by way of a transducer 18 which is operatively connected to the discharge line 17. The transducer may be any of various types; however, one that has been found satisfactory is a 5 VDC high and low pressure transducer 8 PSIA-420 PSIG, which is commercially available from Texas Instruments Inc.

Figure 2:
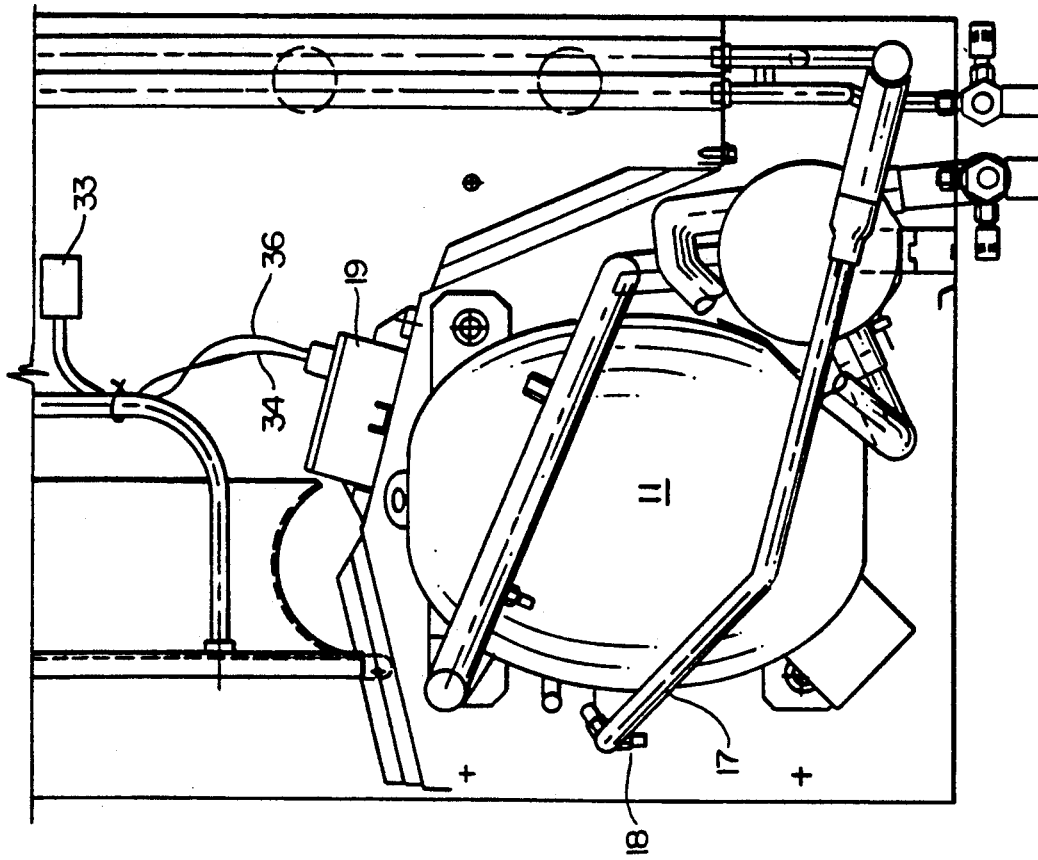
FIG. 2 is a partial top view of the condenser coil thereof showing the installation of the present invention.

The head pressure control board of the present invention is identified by numeral 19 in FIGS. 1 and 2. This may be mounted on a partition in the fan deck area as shown in FIG. 2. The control 19 is connected by its one lead 21 to a high voltage terminal L1, and by its other lead 22 to terminal L2, thru fan motor windings 23. Head pressure control 19 operates to selectively switch the power on and off to the fan motor windings 23 in response to sensed conditions in the system and in the ambient environment.

Inputs to the head pressure control 19 include 24 V AC power, which is provided along leads 27 and 28; the outputs from the transducer 18, which are provided along leads 29,31 and 32; and the outputs from a thermister 33, which are provided by way of leads 34 and 36. The purpose of the thermister 33 is to sense the ambient temperature condition and either permit or preclude the operation of the head pressure control 19 as will be more fully described hereinafter.

In responding to the drop in discharge pressure as sensed by the transducer 18, the head pressure control 19 responds quickly to turn off the power to the fan motor windings 23 by way of a solid state relay shown schematically at 37. The effect of this is to immediately cause the outdoor coil 14 to be less effective in its condensing function and to thereby increase the suction pressure and the discharge pressure. In turn, the transducer 18 senses the increased discharge pressure and causes the head pressure control 19 to responsively turn the power to the windings 23 back on by way of the solid state relay 37. This process will continue at a relatively rapid rate (i.e. a full cycle every 10 seconds or so) for prolonged periods of time. It is therefore necessary to have a solid state relay 37 which can reliably operate in this manner on a long life basis. A solid state relay which has been found suitable for this purpose is one identified by Part No. SIR1A10A6—which can be obtained commercially from SSAC Inc.

It was recognized that the rapid cycling requirements discussed hereinabove must also be taken into account for proper long term operation of the motor driven by the windings 23. In this regard, while the motor 38 with its shaft being supported by ball bearings would be adequate for this purpose, such a motor is also relatively expensive, and can be somewhat noisy. At the same time, it was recognized that the conventional sleeve bearing mounted motor was not adequate to meet these rapid and continuous cycling needs. Provision was thus made for the use of a motor such as that shown in FIG. 3 for driving the fan 23.

Figure 3:
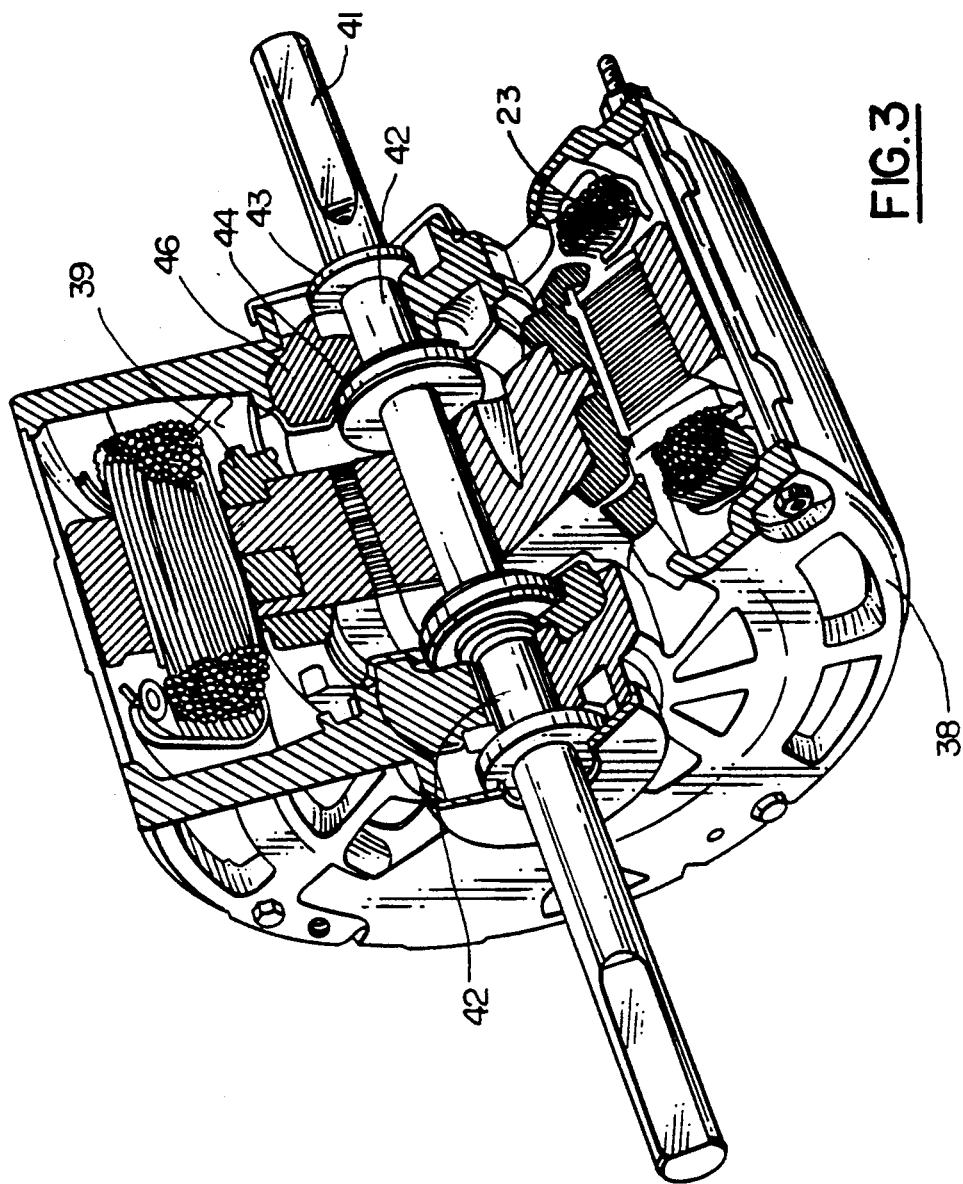
FIG. 3 is a perspective view of the bearing portion of the fan motor of the condenser unit.
Figure 4:
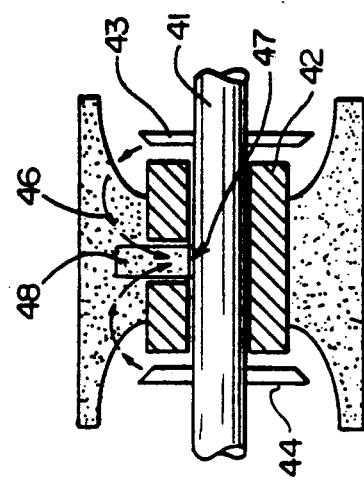
FIG. 4 is a schematic illustration thereof.

The motor 38 shown in FIG. 3 is one which has been found suitable for the present purpose. It is commercially available from General Electric Company under the model designation of KCP 39. Its rotor 39 is fixed to the shaft 41, which in turn is supported by way of a pair of spaced sleeve bearings 42. Oil slingers 43 and 44 are disposed on either side of the bearing 42 and a wick 46 is provided around the circumference of the bearing 42 in order to provide the continuous lubrication thereto as required. This structure and features can be more clearly seen by reference to FIG. 4.

The cylindrical sleeve bearing 42 has a rectangular window 47 formed therein. A feed wick 48 is disposed in the window 47 and provides fluid communication between the wick 46 and the shaft 41. The oil then passes from a storage reservoir 49, through the wick 46 and the feed wick 48 to be wiped onto the shaft 41. It is then carried around from a region of high clearance to low clearance developing sufficient pressure to float the shaft 41. As oil is continually fed into the bearing 41, the excess oil squeezes out the ends and is thrown centrifugally by the oil slingers 43 and 44 back into the storage reservoir 49. By capillary action, it is then returned to the feed wick 48 and the cycle is repeated.

Figure 5:
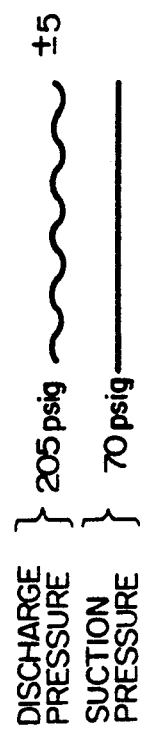
FIG. 5 is a graphic illustration of pressures as maintained by the present invention.

Having described the apparatus, the operation of the air pressure control system will now be described. Assume that the system is operating with R-22 as the refrigerant, with an air cooled condenser at ambient conditions. The ambient temperature is sensed by the thermister 33, and if the temperature is above a predetermined threshold (e.g. 55° F.), then the head pressure control system of the present invention is automatically inactivated since, under those conditions, it is not necessary in order to keep the head pressure up. At temperature conditions below this level, where conventional systems would be shut down from normal heat pump operation (i.e. cooling) because of their susceptibility to freezing up, the present head pressure control would be allowed to operate. First, a desired discharge pressure (e.g. 210 psig) is established. If the discharge pressure in the discharge line 17 drops below 210 psig, then the fan motor 38 is cycled off, and if it rises above 210 psig then the fan motor 38 is cycled back on. When the fan motor is turned off, it causes the head pressure to again increase to the desired level, at which point the fan motor is then again turned on. The result is as shown in FIG. 5, with the discharge pressure remaining close to 205 psig (i.e. plus or minus 5 psig) and the suction pressure remaining substantially constant at 70 psig. This is desirable since a variation in the suction pressure can cause the expansion valve to hunt.

As will be recognized, at lower ambient temperature conditions, it will be necessary to have the fan operating for shorter periods of time, and for the "off" periods to be greater than the "on" periods. Typical test results that have been obtained in this regard are shown in the Table below.

TABLE I

| Ambient Temp. (°F.) | On Period (Seconds) | Off Period (Seconds) |
| --- | --- | --- |
| 55 | 3 | 5 |
| 35 | 2.2 | 7 |
| 25 | 1.5 | 6 |
| 0 | 1.5 | 8 |

It should be recognized that during the motor off periods, the motor speed will drop down from its maximum of 800 rpm, but will not come to a complete stop even for off periods up to 10 seconds. Thus, the existence of an oil film between the bearing surface and the shaft 41 is maintained. That is, as the ambient temperature is decreased and the off periods are correspondingly increased, the motor rotor 39 tends to reduce its rotational speed and thus the amount of oil that is circulated over the shaft 41. However, so long as the motor 38 does not completely stop such that an oil film is lost and metal-to-metal contact is made, the motor 38 will receive proper lubrication during this cycling process. It should also be kept in mind that, as the ambient temperatures are decreased, the viscosity of the oil is also increased and therefore takes longer to drain from the bearings so as to thereby partially offset the effect of lower lubricating levels at lower speeds. Thus, the presently described sleeve bearing motor has been found to operate satisfactorily for long periods of time in this rapid cycling mode of operation.

Although this invention has been shown and described with respect to a preferred embodiment, it will be understood by those skilled in the art that various changes in the form and detail thereof may be made without departing from the spirit and scope of the claimed invention.

What is claimed is:

1. An improved head pressure control for an air conditioning system of a type having a compressor, evaporator, and an air cooled condenser with a motor driven fan, comprising;
   means for sensing the discharge pressure of the compressor; and
   means for sequentially cycling power to the fan motor between the off and on conditions in response to the sensing of such discharge pressure dropping below and rising above a predetermined level, with the period of the off conditions always being greater than the period of the on conditions.

2. An improved head pressure control as set forth in claim 1 wherein said cycling means operates in such a way that said period increases at higher ambient temperatures.

3. An improved head pressure control as set forth in claim 1 wherein said cycling means operates in such a way that the off period does not exceed 10 seconds.

4. An improved head pressure control system as set forth in claim 1 wherein said predetermined level is generally in the 205 psi range.

5. An improved head pressure control as set forth in claim 1 wherein said discharge pressure sensing means comprises a transducer.

6. An improved head pressure control as set forth in claim 1 wherein said cycling means comprises a solid state relay.

7. An improved head pressure control as set forth in claim 1 wherein said cycling means does not allow the motor to come to a full stop during the cycling process.

8. An improved head pressure control as set forth in claim 1 wherein said fan motor is supported by sleeve bearings.

9. An improved head pressure control as set forth in claim 1 and including temperature sensing means for inactivating the head pressure control when the temperature sensing means senses the existence of an ambient temperature above a predetermined level.

10. An improved method of maintaining head pressure during lower ambient temperature conditions in an air conditioning system having a compressor, an evaporator, and a condenser with a motor driven fan, comprising the steps of:
    continuously sensing the discharge pressure of the compressor;
    comparing it with a predetermined threshold level; and
    alternately providing power to and removing power from the fan motor when the discharge pressure respectively exceeds or falls below said predetermined threshold level; wherein the period in which the power is removed exceeds the period in which the power is provided to said motor.

11. An improved method as set forth in claim 10 wherein said power providing and removing step is accomplished by way of a solid state relay.

12. An improved method as set forth in claim 10 wherein said pressure sensing step is accomplished by way of a transducer.

13. An improved method as set forth in claim 10 wherein said period in which said power is removed does not exceed ten seconds.

14. An improved method as set forth in claim 10 wherein said predetermined threshold level is generally at the 205 psi level.

15. An improved method as set forth in claim 10 wherein said period in which the power to said motor is removed is limited so as to not allow the motor to come to a complete stop.

16. An improved method as set forth in claim 10 wherein said fan motor is supported with sleeve bearings.

17. An improved method as set forth in claim 10 and including the additional steps of: sensing the ambient temperature, and allowing the process to proceed only when the ambient temperature is below a predetermined level.

* * * * *